Aug. 21, 1962 E. G. ALLEN ETAL 3,050,282
TURBINE SPEED LIMITING ARRANGEMENT
Filed April 3, 1958
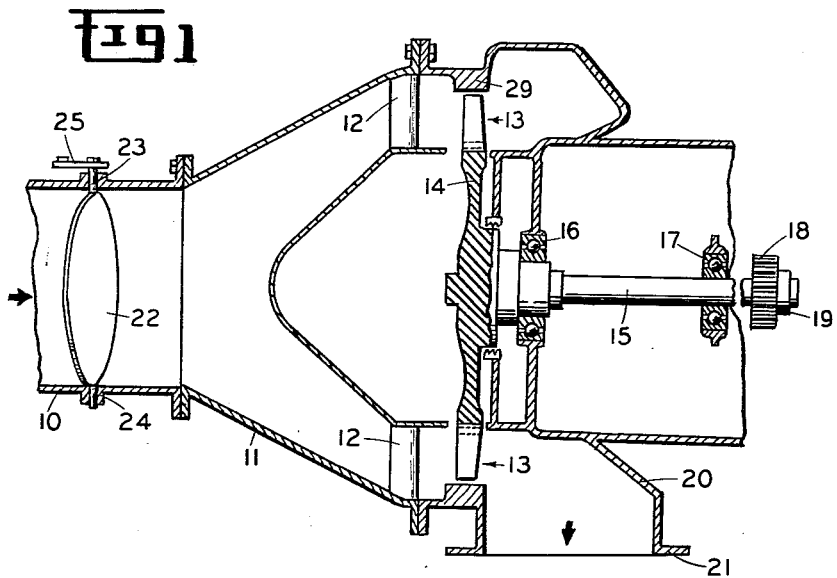
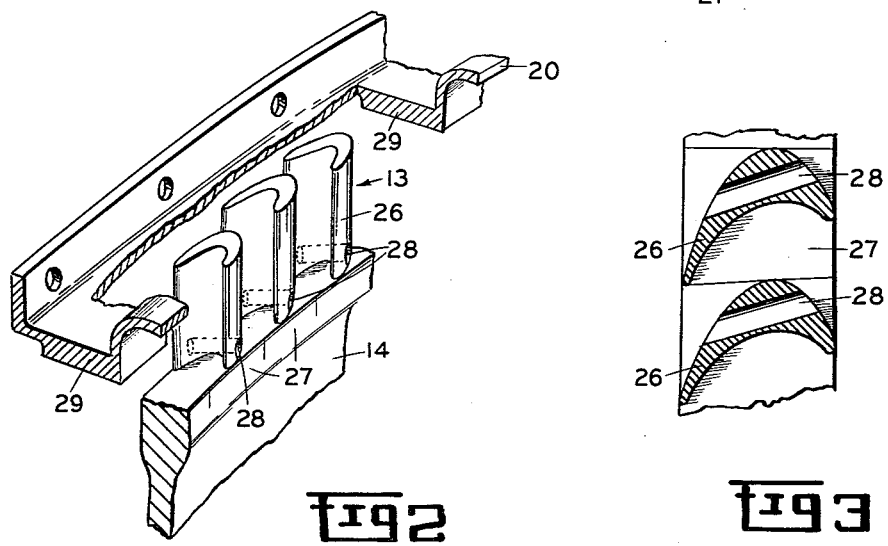
INVENTORS.
ELY G. ALLEN
GRANVILLE E. CARLETON
Lawrence G. Norris
ATTORNEY—

United States Patent Office 3,050,282
Patented Aug. 21, 1962

3,050,282
TURBINE SPEED LIMITING ARRANGEMENT
Ely George Allen, Lynn, and Granville Elbridge Carleton, Beverly Farms, Mass., assignors to General Electric Company, a corporation of New York
Filed Apr. 3, 1958, Ser. No. 726,134
6 Claims. (Cl. 253—77)

Our invention relates to speed limiting means for fluid turbines and, in particular, to an overspeed protective arrangement for gas turbines.

As is well known to those skilled in the art, it has been and is a common practice to provide, in fluid turbine speed control systems, an overspeed protective system which becomes operative in the event of a failure of the primary speed control system. Typical of such arrangements is the overspeed bolt type of device, commonly used in gas turbine applications, which employs a bolt extending transversely through the turbine shaft, the bolt having an eccentric mass and being restrained by suitable spring means. At a preselected overspeed condition, the force generated by the eccentric mass overcomes the restraining spring force and moves radially outward from the shaft to actuate a suitable control device and shut off the gas flow to the turbine.

In certain applications, however, particularly aircraft applications wherein air and gas turbines are employed for various purposes, such as to drive accessories and the like, it is considered necessary or desirable to provide overspeed protection of a very high degree of reliability, going beyond that attainable with overspeed protective systems of the type heretofore known. The need for such a system having an inherently high degree of reliability at a minimum weight penalty has existed for some time in the aircraft field, the primary purpose of such a system being to protect the airframe and the equipment in the airplane against damage resulting from a failure in the turbine or its driven equipment.

Accordingly, it is one object of our invention to provide an overspeed protective arrangement for a fluid turbine, which arrangement inherently provides at a minimum weight penalty a high degree of reliability from the standpoint of preventing damage which might otherwise occur as a result of a failure of the turbine speed control system.

It is another object of our invention to provide an improved overspeed protective system for gas turbines in which an ultimate and highly reliable overspeed protective limit is provided as an inherent characteristic of the turbine structure in a simple and inexpensive manner and at a minimum weight penalty.

In accomplishing these and other objects of our invention, we provide, in one embodiment thereof, a fluid turbine wheel structure having a series of discrete blades or buckets on its periphery with each of the blades having a reduced cross sectional area at a selected point along the blade length such as to cause a stress rupture of the blade at the reduced area section at a preselected turbine rotor speed. The section along the blade length at which the reduced area section is placed is selected such that the portion of the blade remaining on the rotor after the blade portion beyond that section is thrown from the rotor is of insufficient length to produce an accelerating torque on the rotor under the particular fluid flow conditions selected, the failure section being preferably placed at a point such that the mass of the blade fragment thrown from the rotor is at a minimum while still satisfying the foregoing requirement. In combination with the foregoing turbine rotor construction, we provide a turbine casing having a portion extending around the plane of rotation of the turbine wheel which is of sufficient strength and of a structural configuration such as to contain the blade fragments thrown from the rotor at the preselected failure speed.

Thus, it will be appreciated that the maximum speed which the turbine rotor is capable of attaining is limited to a preselected level by the inherent characteristic of the turbine rotor structure itself and that the mass of the fragments thrown from the rotor at the preselected speed is at a minimum, thus permitting containment of the blade fragments within the turbine casing with a relatively simple and lightweight structure.

In carrying out one form of our invention, we have found it desirable to provide the reduced area section by drilling a hole through each turbine blade in a direction generally transverse to the plane of the rotor.

Our invention will be better understood and other objects and advantages thereof will become apparent from the following description, taken in connection with the accompanying drawing, in which FIG. 1 is a fragmentary, cross-sectional view of an air turbine drive for aircraft accessories embodying our invention;

FIG. 2 is a fragmentary, perspective view of a portion of the turbine of FIG. 1, illustrating the bucket structure and the maximum stress failure section therein in greater detail; while FIG. 3 is a cross-sectional view of a portion of the turbine rotor of FIG. 1 taken along the maximum stress failure section represented by the line 3—3 of FIG. 1.

Referring now in particular to the illustration of FIG. 1, there is shown an air turbine drive embodying our invention in one form thereof. The turbine shown is of the type capable of being utilized to supply accessory or auxiliary power for aircraft and utilizes, as an energy source, compressed air supplied through an inlet duct 10 from a suitable supply such as the compressor of a jet engine, not shown. The inlet duct 10 is connected to a conically shaped inlet casing 11 having a series of nozzle vanes 12 mounted therein to direct the air against a series of turbine buckets or blades 13 mounted on a turbine rotor 14. In the embodiment shown, the turbine rotor 14 is formed integrally with a shaft portion 15, which is rotatably supported in bearings 16 and 17 in a well known manner. The buckets 13 are each comprised of an airfoil portion 26 and a base portion 27, the base portions 27 being joined to the turbine rotor 14, in the particular embodiment shown, by being welded thereto. An output pinion 18 is secured to the end of the shaft 15 by means of a nut 19, the pinion 18 being connectible to suitable gear reduction means, not shown, for the purpose of driving a load such as an electrical generator or the like. The turbine discharge gases, in this case air, are ducted to suitable exhaust connections through an exhaust casing 20 having a flange 21 connectible to an exhaust duct.

The speed of the turbine rotor 14 is controlled under normal operating conditions by regulating the flow of air to the turbine in any well known manner, such as by means of a valve 22 mounted in suitable bearing means 23 and 24 in the inlet duct 10. The position of the valve 22 is controlled through the agency of an actuating arm 25 secured to the shaft of the valve, the arm 25 being connected to suitable actuating means forming a part of the turbine speed control system. Thus, under normal operating conditions, the speed of the turbine rotor 14 is regulated as a preselected level by controlling the air flow to the turbine through the valve 22. The turbine may also have a secondary or overspeed control system which acts to close either the valve 22 or an additional control valve mounted in the turbine inlet duct upstream of the valve 22 when the turbine speed reaches or exceeds a predetermined level in excess of the normal operating speed. Such a secondary control may take the form of an eccentric mass type of overspeed bolt which moves radially outward upon reaching the preselected trip speed to actuate suitable control means for closing off the air flow to the turbine.

Gas turbine primary and secondary speed controls of the general type just described are well known to those skilled in the art and have been extensively employed in aircraft air turbine drives of the general type described herein. It will be appreciated that the operation of control systems of this general type must rely on the operation of relatively complex mechanical or electrical mechanisms, usually a number of such elements connected in series with each other, and that while systems of this type have been developed to the point where their reliability is considered to be reasonably high, failures in both systems are likely to produce a catastrophic failure of the turbine equipment, possibly resulting in damage to the airframe or to the equipment situated in the vicinity of the failed turbine unit.

Our invention provides a speed limiting arrangement which substantially eliminates this possibility in that an ultimate speed limiting characteristic is obtained as an inherent function of the turbine structure such that the reliability of operation is extremely high. We provide, in accordance with the embodiment of our invention illustrated, a turbine structure in which each of the turbine buckets 14 is provided with a reduced cross-sectional area section extending generally transversely across the airfoil portion thereof so as to provide, along that section, a stress level which is substantially higher than that encountered at any other possible failure section within the rotor structure. We accomplish this, in the embodiment shown, by providing at a point along the airfoil section 26 of each of the buckets 13 near the root of and in the working portion of the airfoil sections radially beyond the base portions 27 an aperture such as a drilled hole 28 extending through the bucket airfoil portion in a direction generally transverse to the plane of the rotor.

As seen to best advantage in FIG. 3, the holes 28 result in a reduced cross-sectional area of the airfoil, the minimum area occurring at the plane of the center line of the drilled hole. The airfoil cross-sectional area remaining after the material represented by the hole is removed is such that at any preselected operating speed of the rotor, the stress encountered in the general vicinity of the drilled hole is greater than that which is produced at any other potential failure section within the bucket structure or within the rotor 14. The cross-sectional area of the maximum stress section just discussed is selected to provide a stress rupture of the airfoil material along that section at a preselected operating speed, the stress rupture speed being preferably selected such that it is substantially in excess of the speed at which the conventional overspeed protective system is designed to operate. The axes of the holes 28 are preferably located so as to intersect in each case with the radial center lines of the bucket airfoils, the radial center line being the radial line extending through the center of mass of the airfoil, so that substantially the same amount of material is removed on either side of the airfoil radial center line. This minimizes or substantially eliminates the effects of material removal on bucket loading moments and vibration characteristics.

Thus, it will be seen that in the event of a failure of the normal primary and secondary speed control systems, an occurrence which would otherwise allow the turbine to accelerate in an uncontrolled manner to catastrophic failure, the provision of the maximum stress failure section in each of the bucket airfoils causes those portions of the airfoils beyond the failure section to be thrown from the rotor when the speed reaches the preselected failure speed at which stress rupture along the airfoil maximum stress section occurs.

The point along the airfoil section 26 at which the failure section is placed is such that the portions of the bucket airfoils remaining on the rotor after those portions beyond the failure section have been thrown from the rotor are of insufficient height to produce an accelerating torque on the rotor under the conditions of gas flow through the nozzle partitions 12 encountered in the unit. In addition, the failure section is preferably located such that the mass of the airfoil fragments thrown from the rotor is substantially at the minimum required to satisfy the foregoing requirement.

It should be recognized that the term "maximum stress failure section" refers to a cross section along which a stress rupture may occur and that while there will undoubtedly exist a number of points or areas in the rotor where higher stresses are encountered, such as in the vicinity of sharp corners or other stress risers, there are not considered failure sections unless they extend over a sufficient area to cause separation of fragments or particles from the rotor. Thus, in the arrangement of our invention the maximum stress failure section, that is the section along which a stress rupture first occurs as the speed of the turbine rotor is increased, is placed in the bucket airfoil sections as hereinbefore described. It will be therefore be appreciated that stress rupture failures are caused to occur in the bucket airfoil sections at a speed below that at which a failure would occur in any other portion of the turbine rotor structure, such as for instance in the hub or web portion of the rotor. In addition the speed or speed range at which the stress ruptures in the bucket airfoils are caused to occur is capable of being accurately established and controlled within relatively narrow limits.

By way of example it was found possible in one application embodying our invention, wherein the normal turbine operating speed was 20,286 r.p.m. and the overspeed trip range was 22,000–24,000 r.p.m., to control the air-foil section failure speed range within maximum limits of 30,000 to 40,000 r.p.m. over the range of production units without undue manufacturing difficulties, the hub burst speed being in excess of 50,000 r.p.m. In the particular application just mentioned the maximum stress in the bucket airfoils at the nominal failure speed of 35,000 r.p.m. was raised from 60,000 p.s.i. to 110,000 p.s.i. by the provision of the drilled holes, the remaining characteristics of the turbine, such as aerodynamic efficiency and the like, being substantially unaffected. In this application the turbine utilized was of the impulse type in which the pressure drop across the turbine is quite small, thus minimizing the leakage through the holes 28. In addition, the holes are preferably placed so as to extend through the buckets on the downstream side of the airfoil so as to minimize interference with the gas flow through the buckets.

In combination with the above-described turbine rotor structure, we provide means for retaining within the turbine casing the bucket fragments thrown from the rotor at the failure speed. In the embodiment shown, we accomplish this by the provision of a retaining ring or shroud band 29, which extends around the turbine rotor and extends laterally over a dimension slightly greater than the axial width of the buckets 13. The retaining ring 29 is illustrated as being formed integrally with the turbine exhaust casing 20 although it will be appreciated than it can readily take the form of a separate element attachable to the turbine casing in any suitable manner. The retaining ring 29 is of a material and configuration such as to be capable of retaining within the casing the bucket fragments thrown from the turbine wheel at the failure speed.

It will be appreciated that, with the arrangement of our invention, the structural weight of the turbine casing attributable to the function of preventing the bucket fragments from leaving the casing can be held to a minimum, since the individual masses of the bucket fragments thrown from the rotor, and hence the impact energies transmitted thereby are substantially at the minimum consistent with removal of aerodynamic acceleration torque from the turbine rotor. In addition, the provision of the maximum stress failure planes in the bucket airfoils by means of the laterally extending apertures intersecting the airfoil radial center lines has been found not to materially affect the vibration characteristics or blending strength of the blades, so that the basic structural characteristics of the rotor, such as those relating to fatigue life and the like, are not substantially disturbed. It will be apparent, of course, that the maximum stress plane may be provided by reducing the bucket airfoil area in other ways than that shown, although we have found that the provision of the laterally extending aperture with blade material extending radially on both sides thereof to create a "bridge-like" effect at the failure plane provides greater bucket stiffness than the various other methods, such as notching and the like, considered.

It will be apparent that various modifications, substitutions and changes may be made in the particular embodiment of our invention illustrated and described herein without departing from the true scope and spirit of our invention as defined in the following claims.

What we claim as new and desire to secure by Letters Patent is:

1. A turbine rotor comprising a hub portion, a plurality of blades extending radially from said hub portion, and a reduced cross section in each of the airfoil portions of said blades providing a maximum stress failure section in each of said airfoil portions, said maximum stress failure sections providing a stress level in said airfoil portions such that the portions of said airfoil portions extending radially beyond said maximum stress failure sections are thrown from said rotor at a preselected rotational speed of said rotor, the portions of said airfoil portions extending radially inward from said maximum stress failure section being of insufficient length to produce an acceleration torque on said rotor at the operating conditions selected.

2. A turbine rotor comprising a hub portion, a plurality of blade airfoil members extending radially from said hub portion and an aperture extending laterally through each of said airfoil members, the stress level produced in the vicinity of said apertures being such that the portions of said airfoil members extending radially beyond said apertures are thrown from said rotor at a preselected rotational speed of said rotor, said apertures being located such that those portions of said airfoil members extending radially inward from said apertures are of insufficient length to produce an accelerating torque on said rotor at the selected operating conditions and such that the masses of those portions of said airfoil members extending radially beyond said apertures are substantially at the minimum consistent with the attainment of said last-mentioned condition.

3. A turbine comprising a rotor including a hub portion, a plurality of blade airfoil members extending radially from said hub portion, each of said airfoil members having a reduced cross section in the working portion thereof to provide a maximum stress failure section in said working portion, said maximum stress failure sections providing a stress level in said airfoil members such that the portions of said airfoil members extending radially beyond said maximum stress failure sections are thrown from said rotor at a preselected rotational speed of said rotor, the portions of said airfoil members extending radially inward from said maximum stress failure sections being of insufficient length to produce an accelerating torque on said rotor at the operating conditions selected, a casing for said rotor, and means for preventing discharge from said casing along the plane of said rotor of the portions of said airfoil members thrown from said rotor at said preselected speed.

4. A turbine as set forth in claim 3 wherein said last mentioned means comprise a retaining ring supported in said casing and extending around the plane of said rotor, said retaining ring being of a structural configuration such as to inwardly deflect said portions of said airfoil members thrown from said rotor at said preselected speed.

5. A turbine comprising a rotor including a hub portion, a plurality of blade airfoil members extending radially from said hub portion, each of said airfoil members having an aperture extending laterally therethrough, the stress level produced in the vicinity of said apertures being such that the portions of said airfoil members extending radially beyond said apertures are thrown from said rotor at a preselected rotational speed of said rotor, said apertures being located such that those portions of said airfoil members extending radially inward from said apertures are of insufficient length to produce an accelerating torque on said rotor at the selected operating conditions and such that the masses of those portions of said airfoil members extending radially beyond said apertures are substantially at the minimum consistent with the attainment of said last mentioned condition, a casing for said rotor, and means for preventing discharge from said casing along the plane of said rotor of the portions of said airfoil members thrown from said rotor at said preselected speed.

6. A turbine as set forth in claim 5 wherein said last mentioned means comprise a retaining ring supported in said casing and extending around the plane of said rotor, said retaining ring being of a structural configuration such as to inwardly deflect the portions of said airfoil members thrown from said rotor as said preselected speed.

References Cited in the file of this patent

UNITED STATES PATENTS

| 427,060 | Edwards et al. | May 6, 1890 |
| 736,952 | Fox | Aug. 25, 1903 |
| 927,093 | Barton | July 6, 1909 |
| 1,469,045 | MacMurchy | Sept. 25, 1923 |
| 1,718,030 | Cares | June 18, 1929 |
| 2,166,823 | Rosenlocher | July 18, 1939 |
| 2,314,572 | Chitz | Mar. 23, 1943 |
| 2,406,499 | Jandasek | Aug. 27, 1946 |
| 2,494,328 | Bloomberg | Jan. 10, 1950 |

FOREIGN PATENTS

| 24,621 | Sweden | Feb. 8, 1907 |